(12) United States Patent
Kim et al.

(10) Patent No.: US 12,447,874 B2
(45) Date of Patent: Oct. 21, 2025

(54) ELECTRIC SEATBACK-FOLDING DEVICE FOR EMERGENCY ESCAPE

(71) Applicant: HYUNDAI TRANSYS INC., Seosan-si (KR)

(72) Inventors: Sang Min Kim, Hwaseong-si (KR); Jung Bin Lee, Hwaseong-si (KR); Byung Mo Kim, Suwon-si (KR); Jun Kyu Kim, Hwaseong-si (KR); Jae Sung Lee, Pyeongtaek-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 200 days.

(21) Appl. No.: 18/223,547

(22) Filed: Jul. 19, 2023

(65) Prior Publication Data

US 2024/0051437 A1  Feb. 15, 2024

(30) Foreign Application Priority Data

Aug. 12, 2022  (KR) .................. 10-2022-0101153

(51) Int. Cl.
*B60N 2/20* (2006.01)
*B60N 2/02* (2006.01)
*B60N 2/235* (2006.01)

(52) U.S. Cl.
CPC ......... *B60N 2/2352* (2013.01); *B60N 2/0256* (2023.08); *B60N 2/02246* (2023.08); *B60N 2/02258* (2023.08); *B60N 2/20* (2013.01)

(58) Field of Classification Search
CPC ............... B60N 2/2352; B60N 2/0256; B60N 2/02246; B60N 2/20; B60N 2/22; B60N 2/2356
See application file for complete search history.

(56) References Cited

U.S. PATENT DOCUMENTS

| 4,836,608 A * | 6/1989 | Sugiyama | B60N 2/2352 297/378.12 |
| 5,460,429 A * | 10/1995 | Whalen | B60N 2/433 297/378.12 |
| 6,139,105 A * | 10/2000 | Morgos | B60N 2/2352 297/367 R |

(Continued)

FOREIGN PATENT DOCUMENTS

| KR | 10-1078775 B1 | 5/2006 |
| KR | 1020070068859 A | 7/2007 |

(Continued)

OTHER PUBLICATIONS

Request for Submission of an Opinion in Korean Patent Application No. 10-2022-0101153 dated Dec. 19, 2023.

(Continued)

*Primary Examiner* — Syed A Islam
(74) *Attorney, Agent, or Firm* — QUANTUM PATENT LAW FIRM; Seongyoune Kang

(57) ABSTRACT

An electric seatback-folding device for emergency escape enables a controller to accurately recognize whether a seatback (or a seatback frame) is in a locked state or an unlocked state using a microswitch. Folding of the seatback for emergency escape is smoothly performed without malfunction or a control error by operation of a motor in response to a current control signal of the controller.

12 Claims, 7 Drawing Sheets

(56) References Cited

U.S. PATENT DOCUMENTS

| | | | | |
|---|---|---|---|---|
| 7,152,922 B2* | 12/2006 | Garland | ................ | B60N 2/366 296/65.09 |
| 7,152,923 B2* | 12/2006 | Charras | ................ | B60N 2/2352 297/378.12 |
| 7,976,103 B2* | 7/2011 | Gamache | ........... | B60N 2/02246 297/341 |
| 8,388,067 B2* | 3/2013 | Hida | ................ | B60N 2/02246 297/362.11 |
| 8,511,750 B2* | 8/2013 | Moriyama | ............ | B60N 2/225 297/378.12 |
| 8,783,775 B2* | 7/2014 | Kienke | ................ | B60N 2/2352 297/367 R |
| 9,731,632 B2* | 8/2017 | Kajale | ................ | B60N 2/206 |
| 9,758,060 B2* | 9/2017 | Kubota | ............. | B60N 2/02246 |
| 10,059,233 B2* | 8/2018 | Suzuki | ................ | B60N 2/02246 |
| 10,358,053 B2* | 7/2019 | Uno | ................ | B60N 2/20 |
| 10,406,946 B2* | 9/2019 | Kreuels | ................ | B60N 2/366 |
| 11,376,993 B2* | 7/2022 | Banales Cano | .... | B60N 2/02246 |
| 11,427,110 B2* | 8/2022 | Leighton | ............. | B60N 2/0228 |
| 11,718,202 B2* | 8/2023 | Hiemstra | ................ | B60N 2/366 297/354.12 |
| 11,766,957 B2* | 9/2023 | Naik | ................ | B60N 2/20 297/362.11 |
| 2007/0013218 A1* | 1/2007 | Kayumi | ................ | B60N 2/0818 297/344.1 |
| 2009/0039812 A1 | 2/2009 | Seisakusho et al. | | |
| 2010/0072772 A1 | 3/2010 | Gamache et al. | | |
| 2010/0244530 A1* | 9/2010 | Kitano | ................ | B60N 2/2352 297/361.1 |
| 2013/0278036 A1* | 10/2013 | Worden | ................ | B60N 2/12 297/362.11 |
| 2020/0215935 A1 | 7/2020 | Kaisha et al. | | |
| 2022/0009382 A1 | 1/2022 | Leighton et al. | | |

FOREIGN PATENT DOCUMENTS

| | | |
|---|---|---|
| KR | 10-1499994 B1 | 1/2011 |
| KR | 10-2017-0008705 A | 1/2017 |

OTHER PUBLICATIONS

Office Action in German Patent Application No. 102023121247.8 dated Sep. 19, 2024.

Written Decision on Registration in Korean Application No. 10-2022-0101153 dated Nov. 7, 2024.

* cited by examiner

ELECTRIC SEATBACK-FOLDING DEVICE FOR EMERGENCY ESCAPE

CROSS-REFERENCE TO RELATED APPLICATION

This application under 35 U.S.C. § 119(a) claims priority to Korean Patent Application No. 10-2022-0101153 filed on Aug. 12, 2022, the entire contents of which are incorporated herein by reference.

BACKGROUND

(a) Technical Field

The present disclosure relates to an electric seatback-folding device for emergency escape. More particularly, it relates to an electric seatback-folding device for emergency escape, which enables a controller to accurately recognize whether a seatback is in a locked state or an unlocked state using a microswitch, thereby achieving smooth seatback folding for emergency escape.

(b) Background Art

In general, in the case of a vehicle equipped with three or more rows of seats, in the event of an emergency, occupants sitting on the first-row seat and the second-row seat may escape from the vehicle by opening a front door and a rear door, but an occupant sitting on the third-row seat may not secure an escape route quickly due to the seatback of the second-row seat.

Therefore, a manually-operated seatback-folding mechanism for emergency escape is applied to vehicles in order to enable an occupant sitting on a third-row seat to fold the seatback of a second-row seat in order to secure an emergency escape route.

The seatback-folding mechanism for emergency escape may include a seatback-locking device configured to maintain the seatback of the second-row seat in a locked state so that the seatback is not rotated in an unfolded state thereof and to unlock the seatback of the second-row seat so that the seatback is rotated when seatback folding is necessary for emergency escape.

The seatback-folding mechanism for emergency escape is operated manually by an occupant in an emergency situation. However, in a normal situation, the seatback may be automatically folded or unfolded by a separate electric folding mechanism.

In detail, in a normal situation, the seatback may be automatically folded or unfolded by operation of a motor included in the electric folding mechanism, whereas, in an emergency situation such as a traffic accident, the seatback-folding mechanism for emergency escape enables an occupant to manually fold the seatback in case the motor included in the electric folding mechanism fails.

In this case, folding or unfolding of the seatback by the electric folding mechanism may be performed by operation of the motor in response to a current control signal of a controller.

Folding of the seatback by the seatback-folding mechanism for emergency escape may include a process of manually unlocking, by an occupant, a seatback-locking device of the seatback-folding mechanism for emergency escape and a process of pushing, by the occupant, the seatback to fold the same.

However, the controller may not accurately recognize the current position of the seatback for emergency escape or whether the seatback-locking device of the seatback-folding mechanism for emergency escape is in a locked state. Therefore, folding of the seatback for emergency escape may not be performed normally due to the control error of the controller.

In detail, in a normal situation, motor control intervention of the controller (e.g. application of a current to the motor) needs to be performed so that the seatback is automatically folded or unfolded by operation of the motor included in the electric folding mechanism in the state in which the seatback-locking device of the seatback-folding mechanism for emergency escape is locked (i.e. in the state in which there is no manual operation for emergency escape). When the seatback-locking device of the seatback-folding mechanism for emergency escape is unlocked (i.e. when manual operation for emergency escape is performed), motor control intervention of the controller should not be performed in order to enable the occupant to manually fold the seatback for emergency escape.

However, when the seatback-locking device of the seatback-folding mechanism for emergency escape is unlocked (i.e. when manual operation for emergency escape is performed), motor control intervention of the controller (e.g. application of a current to the motor) may be performed in response to a signal generated by operation of a separate switch, which may cause a control error of the controller or malfunction of the motor, thereby consequently interrupting folding of the seatback for emergency escape.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present device has been made in an effort to solve the above-described problems associated with the related art, and it is an object of the present disclosure to provide an electric seatback-folding device for emergency escape, which enables a controller to accurately recognize whether a seatback-locking device of a seatback-folding mechanism for emergency escape is in a locked state or an unlocked state using a microswitch, whereby folding and unfolding of a seatback may be automatically performed by operation of a motor in response to a current control signal of the controller in a locked state of the seatback-locking device, and malfunction of the motor may be prevented during folding of the seatback for emergency escape by interruption of the supply of a current to the motor by the controller in an unlocked state of the seatback-locking device.

In one aspect, the present disclosure provides an electric seatback-folding device for emergency escape including a lever mounted to one of side frames of a seat cushion, a seatback frame rotatably connected to the side frames via a shaft, a motor mounted to the seatback frame and configured to output rotational power to the shaft, a seatback-locking device mounted to the side frames and the seatback frame and configured to unlock the seatback frame when the lever is operated in an unlocking direction or to lock the seatback frame when the lever is moved in a locking direction, a switch mounted to one of the side frames and configured to output an on signal or an off signal depending on whether or not contact is made between the switch and the lever, and a controller configured to perform control such that application of a current signal to the motor is interrupted upon receiving the on signal from the switch and to perform control such that the current signal is applied to the motor upon receiving the off signal from the switch.

In a preferred embodiment, the switch may be configured to be turned on by contact with the lever when the lever is operated in the unlocking direction and to be turned off by release from the lever when the lever is moved in the locking direction.

In another preferred embodiment, the switch may be implemented as a microswitch, and may include a switch body mounted to one of the side frames, a button mounted on one side of the switch body so as to be pushed by the lever, and a signal transmission line connected to another side of the switch body to transmit the on signal or the off signal to the controller.

In still another preferred embodiment, the switch may further include an elastic plate attached to one side of the switch body so as to be contactable with the lever, and the elastic plate may push the button when the lever comes into contact with the elastic plate.

In yet another preferred embodiment, the seatback-locking device may include a first cam connected to the lever and rotatably mounted on the inner surface of a corresponding one of the side frames, a first sector gear coaxially connected to the shaft and located on the inner surface of the corresponding one of the side frames, and a first pawl disposed between the first cam and the first sector gear and rotatably mounted on the inner surface of the corresponding one of the side frames. The first cam may include a locking protrusion integrally formed with an upper portion thereof, and the first pawl may include a pushing protrusion formed on a lower portion thereof to push the locking protrusion of the first cam upward in a state of being in tight contact with the locking protrusion of the first cam, an unlocking recess formed in the lower portion thereof to allow the locking protrusion of the first cam to be inserted thereinto, and a locking tooth portion formed on an upper portion thereof to be engaged with teeth of the first sector gear.

In still yet another preferred embodiment, the seatback-locking device may further include a second cam connected to the lever via a cable and rotatably mounted on the inner surface of the other corresponding one of the side frames, a second sector gear coaxially connected to the shaft and located on the inner surface of the other corresponding one of the side frames, and a second pawl disposed between the second cam and the second sector gear and rotatably mounted on the inner surface of the other corresponding one of the side frames. The second cam may include a locking protrusion integrally formed with an upper portion thereof, and the second pawl may include a pushing protrusion formed on a lower portion thereof to push the locking protrusion of the second cam upward in a state of being in tight contact with the locking protrusion of the second cam, an unlocking recess formed in the lower portion thereof to allow the locking protrusion of the second cam to be inserted thereinto, and a locking tooth portion formed on an upper portion thereof to be engaged with teeth of the second sector gear.

Other aspects and preferred embodiments of the present device are discussed infra.

The above and other features of the present device are discussed infra.

BRIEF DESCRIPTION OF THE DRAWINGS

The above and other features of the present device will now be described in detail with reference to certain exemplary embodiments thereof illustrated in the accompanying drawings which are given hereinbelow by way of illustration only, and thus are not limitative of the present device, and wherein.

Figure 1:
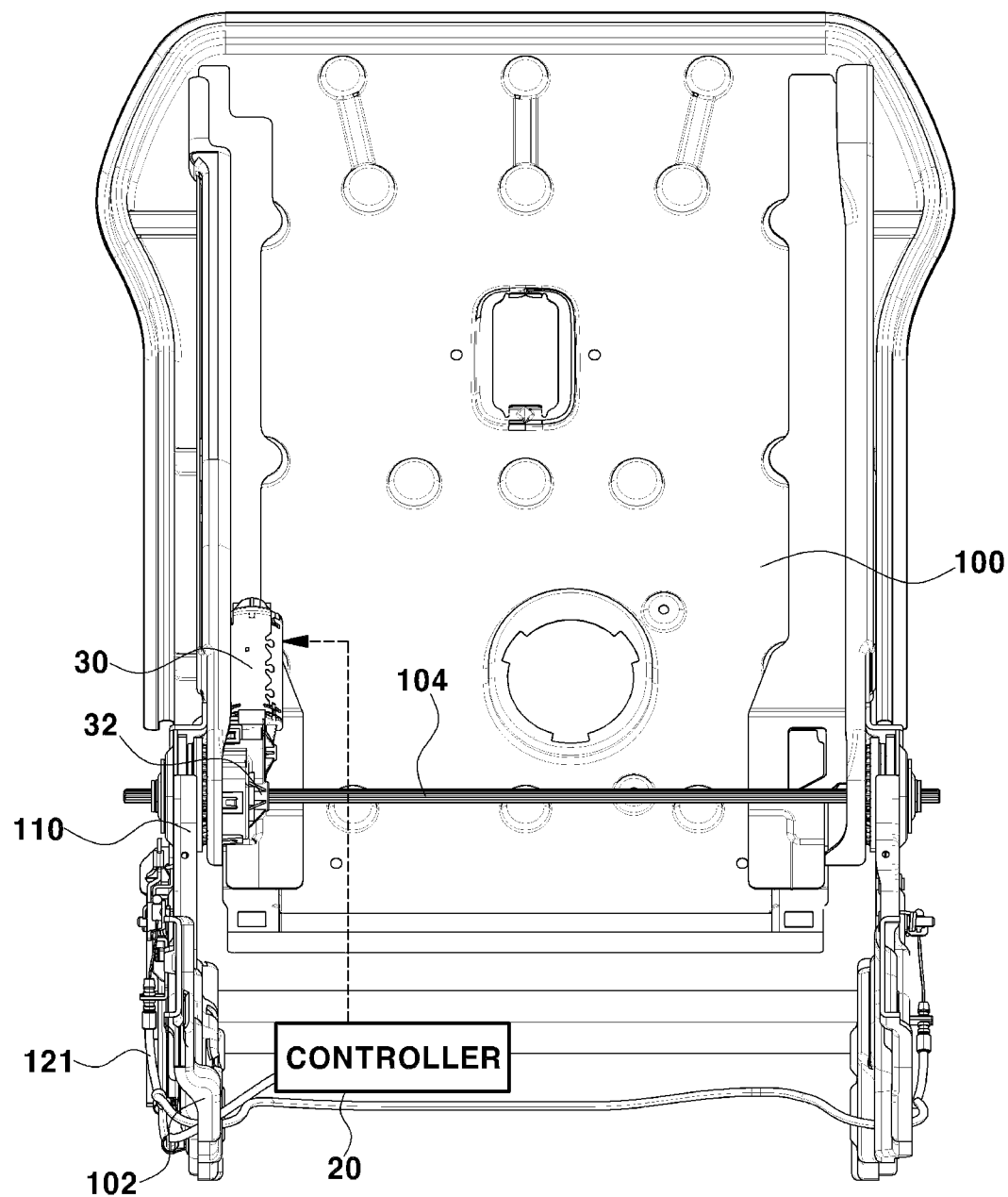
FIG. 1 is a front view showing an electric seatback-folding device for emergency escape according to the present disclosure.

It should be understood that the appended drawings are not necessarily to scale, presenting a somewhat simplified representation of various preferred features illustrative of the basic principles of the present device. The specific design features of the present device as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present device, examples of which are illustrated in the accompanying drawings and described below.

Figure 2:
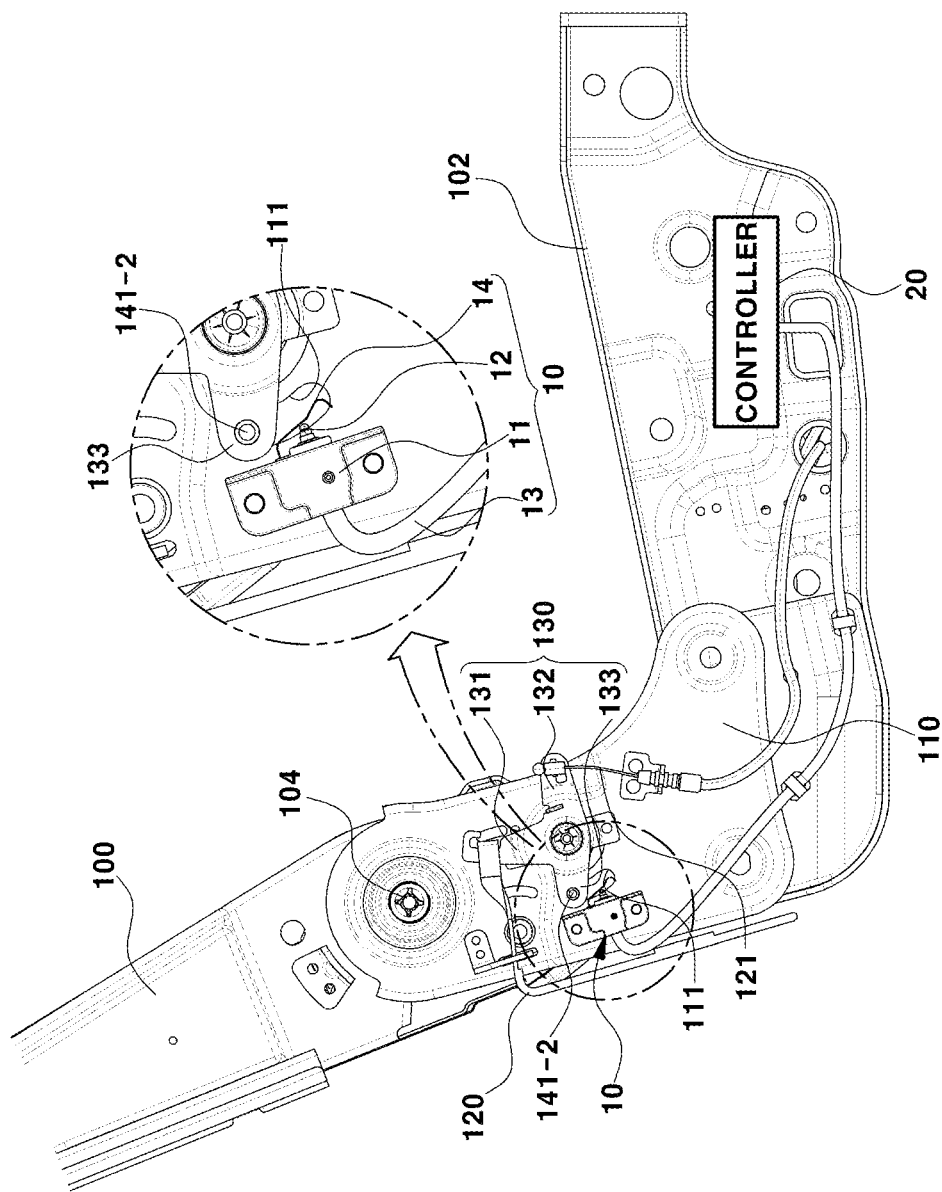
FIGS. 2 and 3 are side views showing states before and after operation of a switch of the electric seatback-folding device for emergency escape according to the present disclosure.
Figure 3:
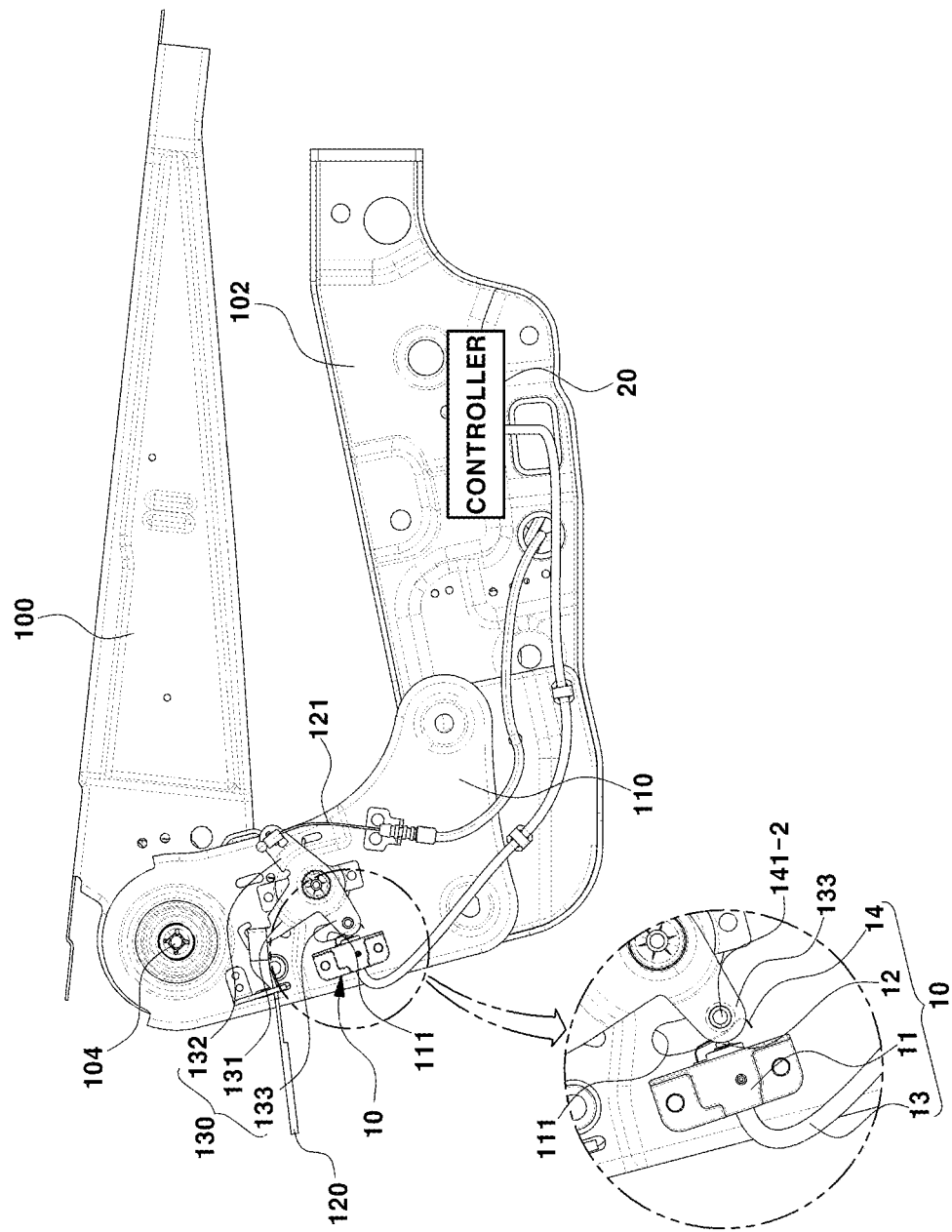

FIG. 1 is a front view showing an electric seatback-folding device for emergency escape according to the present disclosure, and FIGS. 2 and 3 are side views showing states before and after operation of a switch of the electric seatback-folding device for emergency escape according to the present disclosure. In the drawings, reference numeral 100 denotes a seatback frame.

The seatback frame 100 is rotatably connected at both lower end portions thereof to a pair of seat cushion side frames 110 via a shaft 104, and the pair of side frames 110 is connected to a seat cushion frame 102. Therefore, the seatback frame 100 may be folded forwards by rotation of the shaft 104.

To this end, as shown in FIG. 1, a motor 30, which is a component of the electric folding mechanism, may be mounted to the seatback frame 100. The motor 30 may be driven in response to a current control signal of a controller 20. The controller 20 may be embodied as circuitry.

In detail, the shaft 104 may have a spline cross-sectional structure so as to be engaged with an output gear in a reduction gearbox 32 of the motor 30 while passing through the reduction gearbox 32. Although not shown, the output gear in the reduction gearbox 32 may be implemented as a ring gear, which is of an internal gear type that is engaged with the spline of the shaft 104.

When the current signal of the controller 20 is applied to the motor 30, rotational power generated by operation of the motor 30 may be output through the output gear in the gearbox 32. As the output gear is rotated along the spline of the shaft 104, the seatback frame 100, to which the motor 30 is mounted, may be folded forwards about the shaft 104, or may be rotated from the folded position back to the unfolded position along with rotation of the motor 30.

Therefore, in a normal situation, in the state in which the seatback-locking device of the seatback-folding mechanism for emergency escape is locked (i.e. in the state in which there is no manual operation for emergency escape), the seatback may be automatically and easily folded and unfolded by operation of the motor under the control of the controller 20 applying a current to the motor.

The seatback-locking device of the seatback-folding mechanism for emergency escape may include a strap 120 configured to be manually pulled by an occupant, a lever 130 interlocked with the strap 120, a first cam 141 interlocked with the lever 130, a cable 121 interlocked with the lever 130, a first pawl 151 interlocked with the first cam 141, a first sector gear 161 engaged with the first pawl 151 in a locking manner, a second cam 142 interlocked with the cable 121, a second pawl 150 interlocked with the second cam 142, and a second sector gear 162 engaged with the second pawl 150 in a locking manner.

The lever 130 is rotatably mounted on the outer surface of one of the pair of side frames 110.

As shown in FIGS. 2 and 3, the lever 130 rotatably mounted on the outer surface of one of the pair of side frames 110 may include a rotational force transmission bar 133, a first pull bar 131, and a second pull bar 132, which are spaced apart from each other at predetermined angles.

In this case, the strap 120 is connected to the first pull bar 131 of the lever 130 so as to be manually pulled by an occupant sitting on a third-row seat, and one end of the cable 121 is connected to the second pull bar 132 so as to be pulled.

A switch 10 is mounted to the side frame 110 at a position adjacent to the lever 130. The switch 10 serves to assist the controller 20 in accurately recognizing whether the seatback-locking device is in a locked state or an unlocked state. The switch 10 is turned on by contact with the lever 130 when the lever 130 is operated in an unlocking direction, and is turned off by separation from the lever 130 when the lever 130 is moved in a locking direction.

In more detail, the switch 10 is a kind of microswitch, and may include a switch body 11 mounted to the side frame 110, a button 12 mounted on one side of the switch body 11 so as to be pushed by contact with the lever 130, and a signal transmission line 13 connected to the other side of the switch body 11 to transmit an on signal or an off signal to the controller 20.

Preferably, the switch 10 may further include an elastic plate 14 attached to one side of the switch body 11 and disposed to be contactable with the lever 130.

The elastic plate 14 serves to push the button 12 when the lever 130 comes into contact with the elastic plate 14.

When the lever 130 is operated in the unlocking direction, the lever 130 presses the elastic plate 14, and the elastic plate 14 pushes the button 12 of the switch 10, whereby a switch-on signal may be transmitted to the controller 20 through the signal transmission line 13.

On the other hand, when the lever 130 is moved in the locking direction to the original position thereof, the contact pressing force of the lever 130 to the elastic plate 14 is removed, and thus the button 12 is released from the elastic plate 14 that has pushed the button 12, whereby a switch-off signal may be transmitted to the controller 20 through the signal transmission line 13.

The controller 20 is configured to interrupt the application of a current signal to the motor 30 upon receiving the on signal from the switch 10 and to apply the current signal to the motor 30 upon receiving the off signal from the switch 10.

The seatback-locking device may be mounted across the side frame 110 and the seatback frame 100. When the lever 130 is operated in the unlocking direction, the seatback-locking device may unlock the seatback frame 100 so that the seatback frame 100 is rotated in the folding direction, and when the lever 130 is moved in the locking direction to the original position thereof, the seatback-locking device may lock the seatback frame 100 so that the seatback frame 100 is not rotated.

Figure 4:
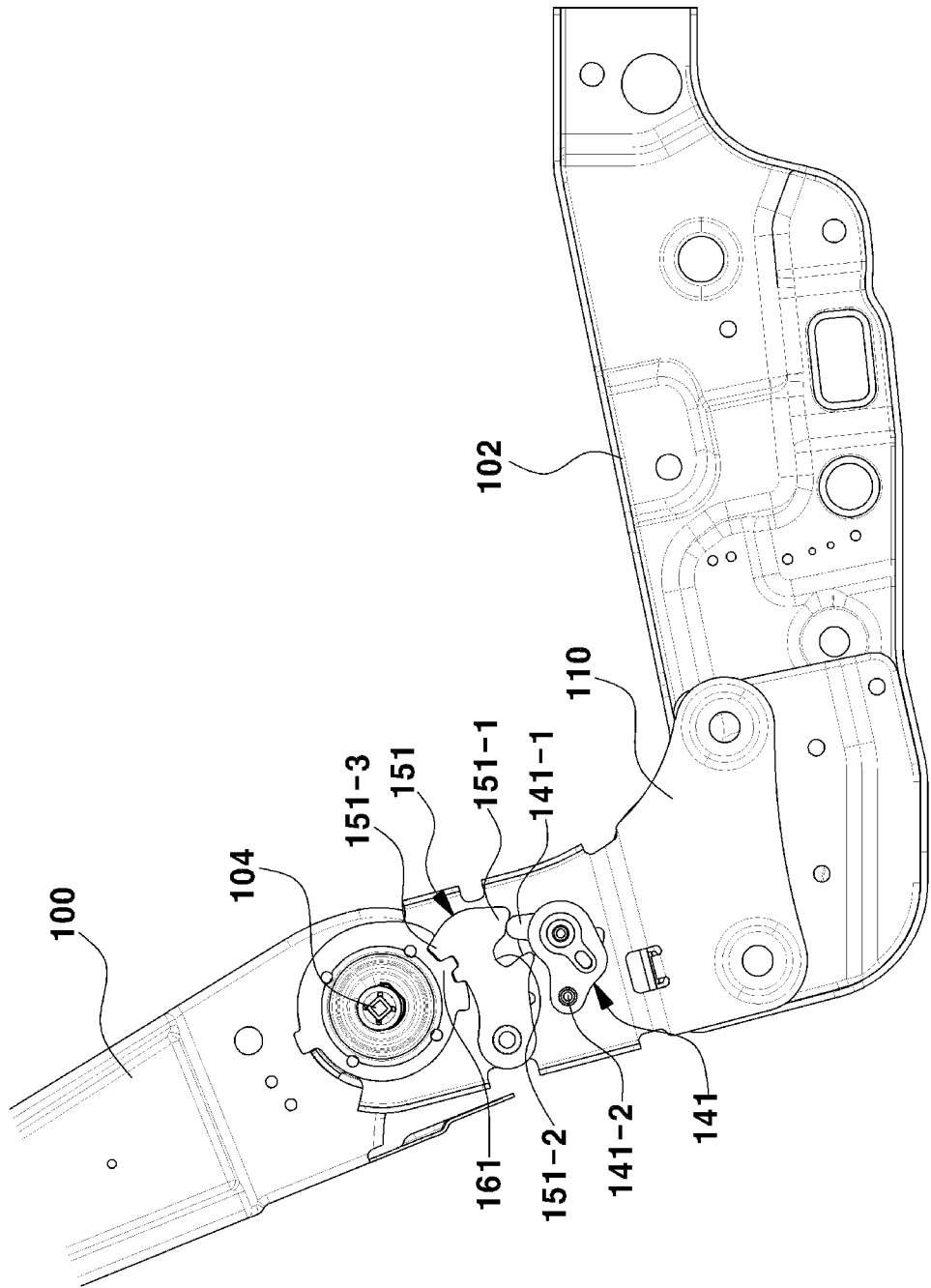
FIGS. 4 and 5 are left views showing states before and after operation of the electric seatback-folding device for emergency escape according to the present disclosure.
Figure 5:
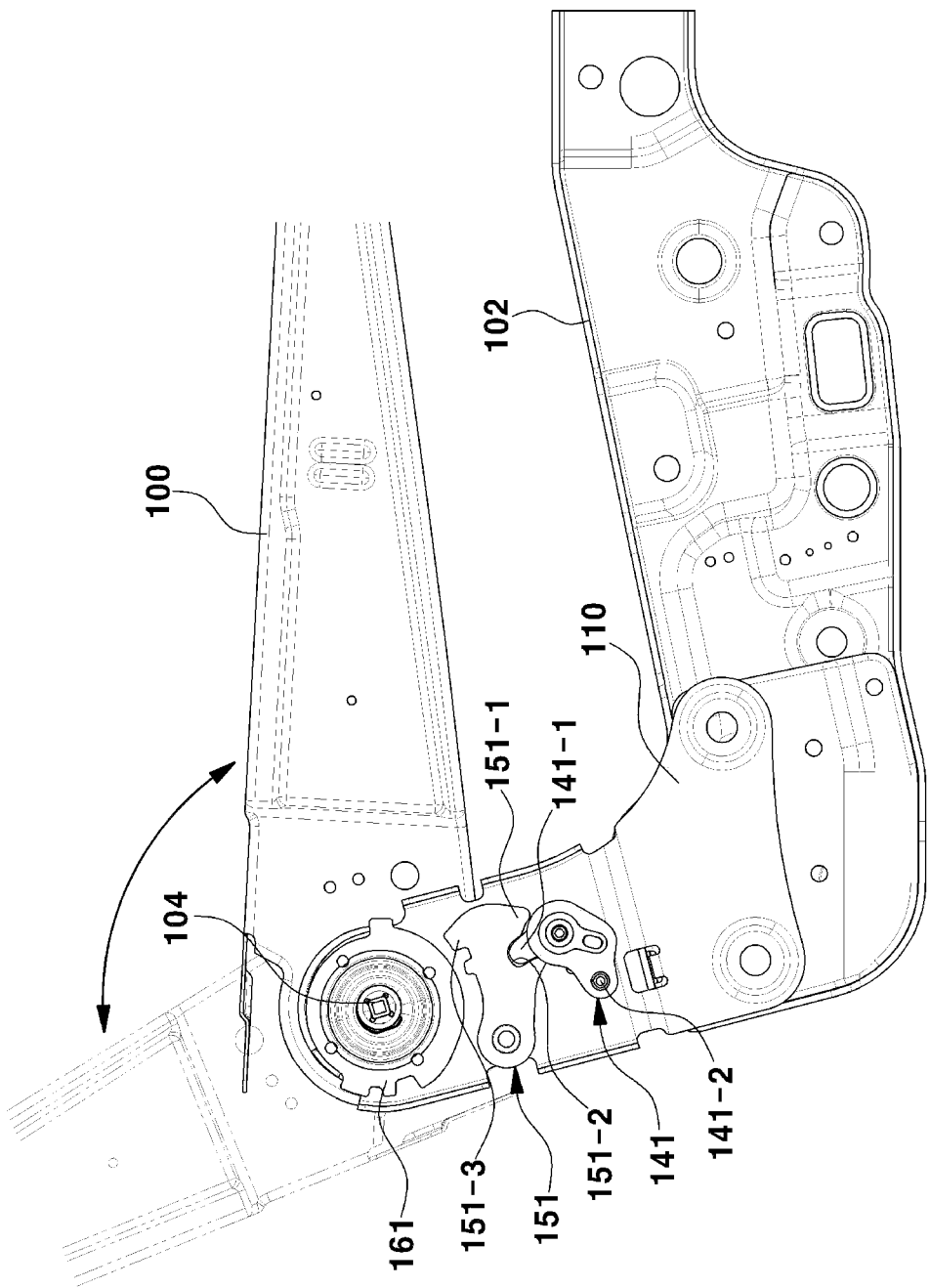

To this end, as shown in FIGS. 4 and 5, the seatback-locking device may include a first cam 141 connected to the lever 130 and rotatably mounted on the inner surface of a corresponding one of the side frames 110, a first sector gear 161 coaxially connected to the shaft 104 and located on the inner surface of the corresponding one of the side frames 110, and a first pawl 151 disposed between the first cam 141 and the first sector gear 161 and rotatably mounted on the inner surface of the corresponding one of the side frames 110.

In more detail, the first cam 141, which is connected to the rotational force transmission bar 133 of the lever 130 via a connection pin 141-2, is rotatably mounted on the inner surface of a corresponding one of the pair of side frames 110, and the connection pin 141-2 is inserted into a guide slot 111 formed through the corresponding one of the pair of side frames 110 so as to be movable. The first sector gear 161 coaxially coupled to the shaft 104 is mounted on the inner surface of the corresponding one of the pair of side frames 110, and the first pawl 151 is rotatably mounted on the inner surface of the corresponding one of the pair of side frames 110 so as to be disposed between the first cam 141 and the first sector gear 161.

A locking protrusion 141-1 is integrally formed with the upper portion of the first cam 141. A pushing protrusion 151-1, which pushes the locking protrusion 141-1 upward in a state of being in tight contact therewith, and an unlocking recess 151-2, into which the locking protrusion 141-1 is inserted, are formed to be contiguous with each other in the lower portion of the first pawl 151, and a locking tooth portion 151-3, which is engaged with teeth of the first sector gear 161, is formed on the upper portion of the first pawl 151.

Figure 6:
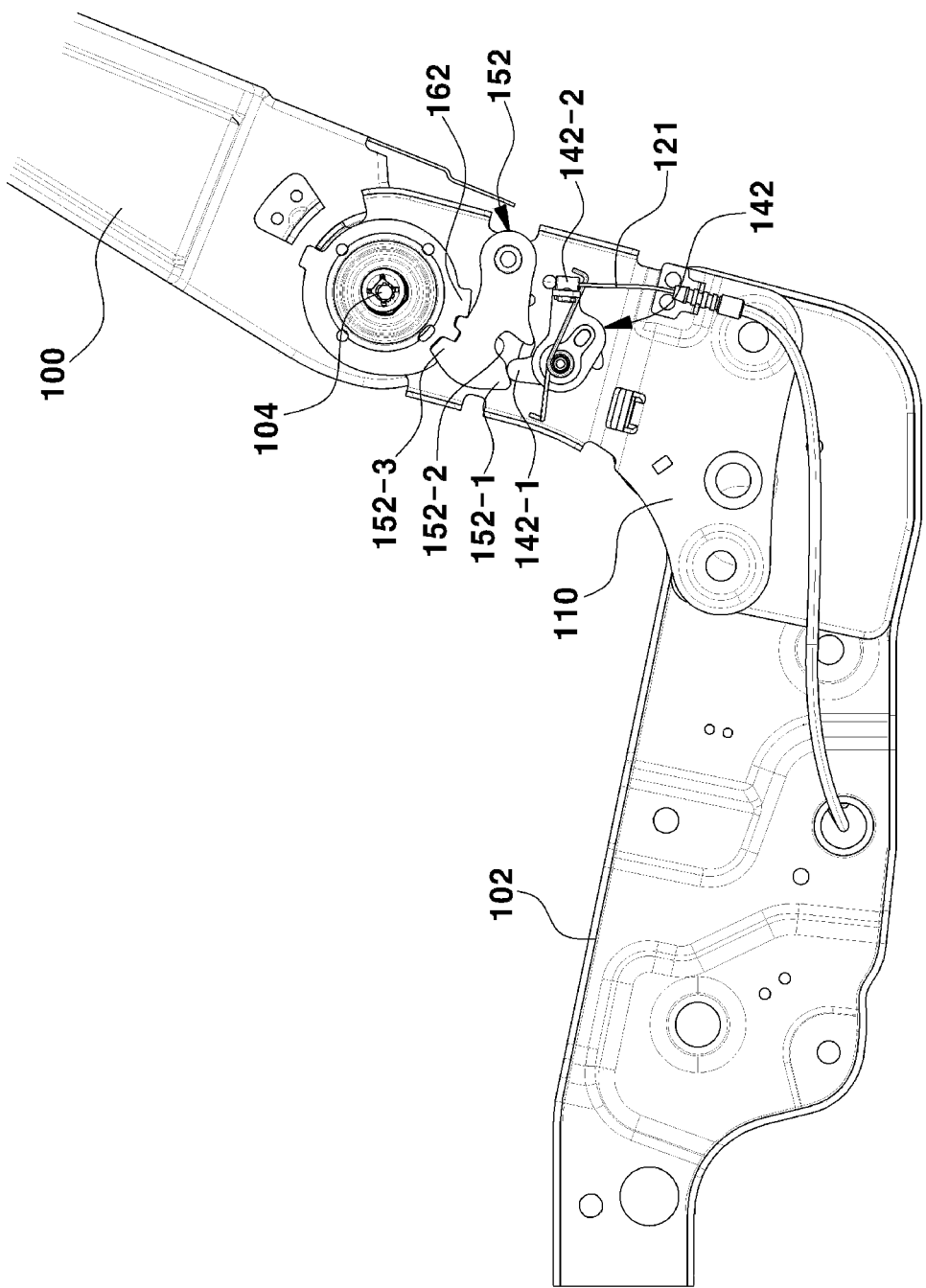
FIGS. 6 and 7 are right views showing states before and after operation of the electric seatback-folding device for emergency escape according to the present disclosure.
Figure 7:
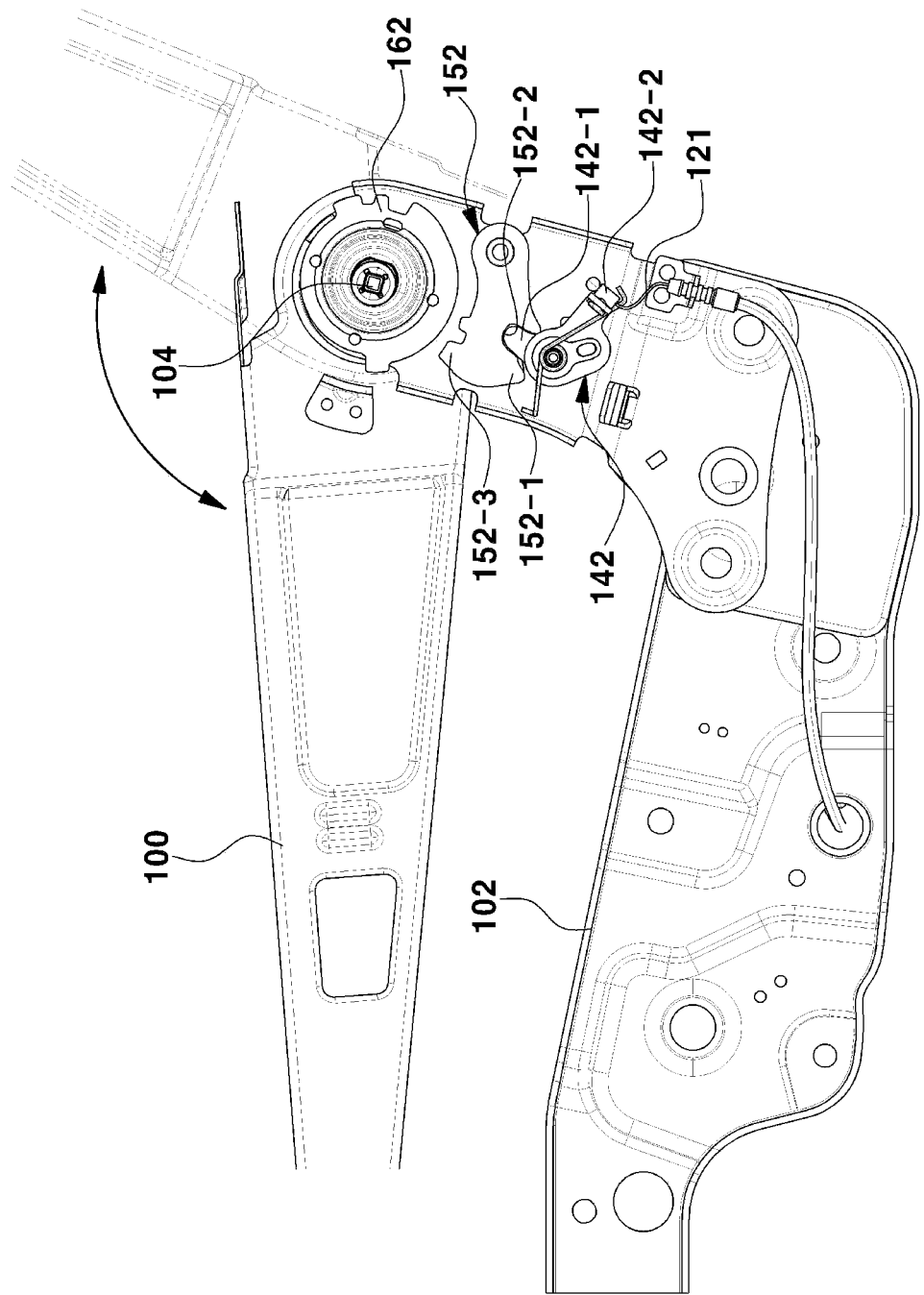

As shown in FIGS. 6 and 7, the seatback-locking device may further include a second cam 142 connected to the lever 130 via the cable 121 and rotatably mounted on the inner surface of the other corresponding one of the side frames 110, a second sector gear 162 coaxially connected to the shaft 104 and located on the inner surface of the other corresponding one of the side frames 110, and a second pawl 150 disposed between the second cam 142 and the second sector gear 162 and rotatably mounted on the inner surface of the other corresponding one of the side frames 110.

In more detail, the second cam 142, which is connected to the other end of the cable 121, is rotatably mounted on the inner surface of the other corresponding one of the pair of side frames 110, the second sector gear 162 coaxially coupled to the shaft 104 is mounted on the inner surface of the other corresponding one of the pair of side frames 110, and the second pawl 150 is rotatably mounted on the inner surface of the other corresponding one of the pair of side frames 110 so as to be disposed between the second cam 142 and the second sector gear 162.

A locking protrusion 142-1 is integrally formed with the upper portion of the second cam 142. A pushing protrusion 152-1, which pushes the locking protrusion 142-1 upward in a state of being in tight contact therewith, and an unlocking recess 152-2, into which the locking protrusion 142-1 is inserted, are formed in the lower portion of the second pawl 150, and a locking tooth portion 152-3, which is engaged with teeth of the second sector gear 162, is formed on the upper portion of the second pawl 150.

In addition, a cable connection end 142-2 protrudes from the outer surface of the second cam 142, and the other end of the cable 121 is connected to the cable connection end 142-2.

Hereinafter, operation of the electric seatback-folding device for emergency escape according to the present disclosure configured as described above will be described.

When the seatback-locking device is maintained in a locked state, i.e. when manual operation for emergency escape is not performed on the seatback-locking device (e.g. when the strap is not pulled), the lever 130 is not rotated in the unlocking direction and remains at the original locked position thereof, as shown in FIG. 2.

In more detail, when the lever 130 is not rotated in the unlocking direction and remains at the original locked position, as can be seen from FIG. 4, the locking tooth portion 151-3 of the first pawl 151 is engaged with the teeth of the first sector gear 161, and as can be seen from FIG. 6, the locking tooth portion 152-3 of the second pawl 150 is engaged with the teeth of the second sector gear 162. Therefore, rotation of the first and second sector gears 161 and 162 is restricted, and rotation of the shaft 104, which is connected to the first and second sector gears 161 and 162, is also restricted. In this manner, the seatback-locking device may be maintained in the locked state.

As shown in FIG. 2, when the lever 130 is not rotated in the unlocking direction and remains at the original locked position, the first pull bar 131 of the lever 130 is in a state of being spaced apart from the elastic plate 14 of the switch 10, and thus the elastic plate 14 does not push the button 12 of the switch 10 and remains at the original position thereof.

Accordingly, the switch 10 outputs a switch-off signal to the controller 20 through the signal transmission line 13.

Upon receiving the off signal from the switch 10, the controller 20 may accurately recognize that the seatback-locking device is in the locked state. In addition, since the seatback-locking device is in the locked state (i.e. there is no manual operation for emergency escape), the controller 20 may determine that application of a current to the motor of the electric folding mechanism is possible.

In this state, when a separate switch (not shown) for motor-driven folding or unfolding is operated and the controller 20 applies a current signal to the motor 30, rotational power generated by operation of the motor 30 may be output through the output gear in the gearbox 32. As the output gear is rotated along the spline of the shaft 104, the seatback frame 100, to which the motor 30 is mounted, may be folded forwards about the shaft 104, or may be rotated from the folded position back to the unfolded position along with rotation of the motor 30 and the gearbox 32.

In this way, in a normal situation, in the state in which the seatback-locking device of the seatback-folding mechanism for emergency escape is locked (i.e. in the state in which there is no manual operation for emergency escape), the seatback may be automatically and easily folded and unfolded by operation of the motor under the control of the controller 20 applying a current to the motor.

On the other hand, when an occupant sitting on the third-row seat manually pulls the strap 120 in an emergency escape situation, as shown in FIG. 3, the first pull bar 131 of the lever 130, to which the strap 120 is connected, is pulled, and the lever 130 is rotated in the unlocking direction. At the same time, the second pull bar 132 is also rotated in the unlocking direction, and the cable 121 connected to the second pull bar 132 is also pulled in the unlocking direction.

Subsequently, when the lever 130 is rotated in the unlocking direction, the first cam 141, which is connected to the rotational force transmission bar 133 of the lever 130 via the connection pin 141-2, is rotated in the unlocking direction, whereby the locking protrusion 141-1 of the first cam 141 is separated away from the pushing protrusion 151-1 of the first pawl 151 and is displaced to a position capable of insertion into the unlocking recess 151-2 in the first pawl 151.

Subsequently, when the locking protrusion 141-1 of the first cam 141 reaches a position capable of insertion into the unlocking recess 151-2 in the first pawl 151, the first pawl 151 is rotated in a downward direction due to gravity or elastic restoring force of a spring (not shown), whereby the locking protrusion 141-1 is inserted into the unlocking recess 151-2, and the locking tooth portion 151-3 of the first pawl 151 is disengaged from the teeth of the first sector gear 161, as can be seen from FIG. 5.

In addition, as the cable 121 is pulled in the unlocking direction, the cable connection end 142-2, to which the other end of the cable 121 is connected, is pulled, and thus the second cam 142 is rotated in the unlocking direction, whereby the locking protrusion 142-1 of the second cam 142 is separated away from the pushing protrusion 152-1 of the second pawl 150 and is displaced to a position capable of insertion into the unlocking recess 152-2 in the second pawl 150.

Subsequently, when the locking protrusion 142-1 of the second cam 142 reaches a position capable of insertion into the unlocking recess 152-2 in the second pawl 150, the second pawl 150 is rotated in a downward direction due to gravity or elastic restoring force of a spring (not shown), whereby the locking protrusion 142-1 is inserted into the unlocking recess 152-2, and the locking tooth portion 152-3 of the second pawl 150 is disengaged from the teeth of the second sector gear 162, as can be seen from FIG. 7. Consequently, the unlocking process is completed.

In this case, when the lever 130 is rotated in the unlocking direction by manual operation of pulling the strap 120 by the occupant sitting on the third-row seat, the lever 130 presses the elastic plate 14, and the elastic plate 14 pushes the button 12 of the switch 10, whereby a switch-on signal may be output to the controller 20 through the signal transmission line 13.

Substantially, when the lever 130 is rotated in the unlocking direction, the connection pin 141-2 connected to the rotational force transmission bar 133 of the lever 130 presses the elastic plate 14, and the elastic plate 14 pushes the button 12 of the switch 10, whereby the switch-on signal may be output to the controller 20 through the signal transmission line 13.

Upon receiving the switch-on signal, the controller 20 may accurately recognize that the seatback-locking device is in the unlocked state, in which the locking tooth portion 151-3 of the first pawl 151 is disengaged from the teeth of the first sector gear 161 and the locking tooth portion 152-3 of the second pawl 150 is disengaged from the teeth of the second sector gear 162.

In addition, when the controller 20 accurately recognizes that the seatback-locking device is in the unlocked state (i.e. there is manual operation for emergency escape), the controller 20 performs control such that application of a current to the motor of the electric folding mechanism is interrupted. Consequently, in the unlocked state of the seatback-locking device, supply of a current to the motor 30 of the electric folding mechanism is interrupted by the current blocking control of the controller 20.

Therefore, when the occupant sitting on the third-row seat pushes the seatback frame 100 forwards in the unlocked state of the seatback-locking device, the seatback frame 100 may be rotated forwards together with the shaft 104 and the first and second sector gears 161 and 162 connected to the shaft 104 to be folded, as can be seen from FIGS. 5 and 7. As a result, the occupant sitting on the third-row seat may easily secure an emergency escape route.

As described above, when the seatback-locking device of the seatback-folding mechanism for emergency escape is in the unlocked state (i.e. when there is manual operation for emergency escape), the controller performs control such that application of a current to the motor is interrupted, thereby preventing malfunction of the motor causing failure in folding of the seatback for emergency escape, thus ensuring smooth folding of the seatback for emergency escape.

As is apparent from the above description, the present device has the following effects.

First, a controller may accurately recognize whether a seatback-locking device of a seatback-folding mechanism for emergency escape is in a locked state or an unlocked state using a microswitch, and accordingly, may accurately determine whether to allow or interrupt the application of a current to a motor.

Second, in a normal situation, in the state in which the seatback-locking device of the seatback-folding mechanism for emergency escape is locked (i.e. in the state in which there is no manual operation for emergency escape), a seatback may be automatically and easily folded and unfolded by operation of the motor under the control of the controller applying a current to the motor.

Third, when the seatback-locking device of the seatback-folding mechanism for emergency escape is in the unlocked state (i.e. when there is manual operation for emergency escape), the controller may perform control such that application of a current to the motor is interrupted, thereby preventing malfunction of the motor causing failure in folding of the seatback for emergency escape, thus ensuring smooth folding of the seatback for emergency escape.

The present device has been described above with reference to an exemplary embodiment. The embodiment described in the specification and shown in the accompanying drawings is illustrative only and is not intended to represent all aspects of the device. Therefore, the present device is not limited to the embodiment presented herein, and it is to be understood by those skilled in the art that various modifications or changes can be made without departing from the technical spirit or scope of the disclosure as disclosed in the appended claims.

What is claimed is:

1. An electric seatback-folding device for emergency escape, the electric seatback-folding device comprising:
   a lever rotatably mounted to an outer surface of one of side frames of a seat cushion and including a rotational force transmission bar, a first pull bar, and a second pull bar, which are spaced apart from each other at predetermined angles;
   a seatback frame rotatably connected to the side frames via a shaft;
   a motor mounted to the seatback frame and configured to output rotational power to the shaft;
   a seatback-locking device mounted to the side frames and the seatback frame and configured to unlock the seatback frame when the lever is operated in an unlocking direction or to lock the seatback frame when the lever is moved in a locking direction, the seatback-locking device further including a cable and a strap connected to a first pull bar of the lever so as to be manually operable by an occupant seated in a rear seat;
   a switch mounted to one of the side frames and configured to output an on signal or an off signal depending on respectively whether or not contact is made between the switch and the lever; and
   control circuitry configured to interrupt application of a current signal to the motor upon receiving the on signal from the switch and to apply the current signal to the motor upon receiving the off signal from the switch,
   wherein the second pull bar is connected to one end of the cable of the seatback-locking device.

2. The electric seatback-folding device of claim 1, wherein the switch is configured to be turned on by contact with the lever when the lever is operated in the unlocking direction and to be turned off by release from the lever when the lever is moved in the locking direction.

3. The electric seatback-folding device of claim 1, wherein the switch is implemented as a microswitch and comprises:
   a switch body mounted to one of the side frames;
   a button mounted on one side of the switch body so as to be pushable by the lever; and
   a signal transmission line connected to another side of the switch body and configured to transmit the on signal or the off signal to the control circuitry.

4. The electric seatback-folding device of claim 3, wherein the switch further comprises an elastic plate attached to one side of the switch body so as to be contactable with the lever, and
   wherein the elastic plate is configured to push the button when the lever comes into contact with the elastic plate.

5. The electric seatback-folding device of claim 1, wherein the seatback-locking device comprises:
   a first cam connected to the lever and rotatably mounted on an inner surface of a first corresponding one of the side frames;
   a first sector gear coaxially connected to the shaft and located on the inner surface of the first corresponding one of the side frames, the first sector gear including teeth; and
   a first pawl disposed between the first cam and the first sector gear and rotatably mounted on the inner surface of the first corresponding one of the side frames,
   wherein the first cam comprises a locking protrusion integrally formed with an upper portion thereof, and the first pawl comprises a pushing protrusion formed on a lower portion thereof and configured to push the locking protrusion of the first cam upward while the first pawl is in contact with the locking protrusion of the first cam, an unlocking recess formed in the lower portion of the first pawl and configured to allow the locking protrusion of the first cam to be inserted thereinto, and a locking tooth portion formed on an upper portion of the first pawl and configured to be engaged with the teeth of the first sector gear.

6. The electric seatback-folding device of claim 5, wherein the seatback-locking device further comprises:
   a second cam connected to the lever via the cable and rotatably mounted on an inner surface of a second corresponding one of the side frames;

a second sector gear coaxially connected to the shaft and located on the inner surface of the second corresponding one of the side frames; and a second pawl disposed between the second cam and the second sector gear and rotatably mounted on the inner surface of the second corresponding one of the side frames, and wherein the second cam comprises a locking protrusion integrally formed with an upper portion thereof, and the second pawl comprises a pushing protrusion formed on a lower portion thereof and configured to push the locking protrusion of the second cam upward while the second pawl is in contact with the locking protrusion of the second cam, an unlocking recess formed in the lower portion of the second pawl to allow the locking protrusion of the second cam to be inserted thereinto, and a locking tooth portion formed on an upper portion of the second pawl to be engaged with teeth of the second sector gear.

7. An electric seatback-folding device for emergency escape, the electric seatback-folding device comprising:

a lever rotatably mounted to an outer surface of one of side frames of a seat cushion and including a first pull bar, and a second pull bar spaced apart from each other at a predetermined angle;

a seatback frame rotatably connected to the side frames via a shaft;

a motor mounted to the seatback frame and configured to output rotational power to the shaft;

a seatback-locking device mounted to the side frames and the seatback frame and configured to unlock the seatback frame when the lever is operated in an unlocking direction or to lock the seatback frame when the lever is moved in a locking direction, the seatback-locking device further including a cable and a strap, one end of the cable of the seatback-locking device connected to the second pull bar, the strap connected to the first pull bar so as to be manually operable by a rearwardly located occupant;

a switch mounted to one of the side frames and configured to output an on signal or an off signal depending on respectively whether or not contact is made between the switch and the lever; and control circuitry configured to interrupt application of a current signal to the motor upon receiving the on signal from the switch and to apply the current signal to the motor upon receiving the off signal from the switch.

8. The electric seatback-folding device of claim 7, wherein the switch is configured to be turned on by contact with the lever when the lever is operated in the unlocking direction and to be turned off by release from the lever when the lever is moved in the locking direction.

9. The electric seatback-folding device of claim 7, wherein the switch is implemented as a microswitch and comprises:

a switch body mounted to one of the side frames;

a button mounted on one side of the switch body so as to be pushable by the lever; and a signal transmission line connected to another side of the switch body and configured to transmit the on signal or the off signal to the control circuitry.

10. The electric seatback-folding device of claim 9, wherein the switch further comprises an elastic plate attached to one side of the switch body so as to be contactable with the lever, and wherein the elastic plate is configured to push the button when the lever comes into contact with the elastic plate.

11. The electric seatback-folding device of claim 7, wherein the seatback-locking device comprises:

a first cam connected to the lever and rotatably mounted on an inner surface of a first corresponding one of the side frames;

a first sector gear coaxially connected to the shaft and located on the inner surface of the first corresponding one of the side frames, the first sector gear including teeth; and a first pawl disposed between the first cam and the first sector gear and rotatably mounted on the inner surface of the first corresponding one of the side frames, wherein the first cam comprises a locking protrusion integrally formed with an upper portion thereof, and the first pawl comprises a pushing protrusion formed on a lower portion thereof and configured to push the locking protrusion of the first cam upward while the first pawl is in contact with the locking protrusion of the first cam, an unlocking recess formed in the lower portion of the first pawl and configured to allow the locking protrusion of the first cam to be inserted thereinto, and a locking tooth portion formed on an upper portion of the first pawl and configured to be engaged with the teeth of the first sector gear.

12. The electric seatback-folding device of claim 11, wherein the seatback-locking device further comprises:

a second cam connected to the lever via the cable and rotatably mounted on an inner surface of a second corresponding one of the side frames;

a second sector gear coaxially connected to the shaft and located on the inner surface of the second corresponding one of the side frames; and a second pawl disposed between the second cam and the second sector gear and rotatably mounted on the inner surface of the second corresponding one of the side frames, and wherein the second cam comprises a locking protrusion integrally formed with an upper portion thereof, and the second pawl comprises a pushing protrusion formed on a lower portion thereof and configured to push the locking protrusion of the second cam upward while the second pawl is in contact with the locking protrusion of the second cam, an unlocking recess formed in the lower portion of the second pawl to allow the locking protrusion of the second cam to be inserted thereinto, and a locking tooth portion formed on an upper portion of the second pawl to be engaged with teeth of the second sector gear.

* * * * *